US008740122B2

(12) United States Patent
Brendler

(10) Patent No.: US 8,740,122 B2
(45) Date of Patent: Jun. 3, 2014

(54) ROLLER PRESS GRID ARMORING COMPRISING RING-SHAPED BOLTS

(75) Inventor: Dieter Brendler, Bergisch Gladbach (DE)

(73) Assignee: KHD Humboldt Wedag GmbH, Cologne (DE)

( * ) Notice: Subject to any disclaimer, the term of this patent is extended or adjusted under 35 U.S.C. 154(b) by 121 days.

(21) Appl. No.: 13/390,479

(22) PCT Filed: Aug. 12, 2010

(86) PCT No.: PCT/EP2010/061741
§ 371 (c)(1),
(2), (4) Date: Feb. 14, 2012

(87) PCT Pub. No.: WO2011/020764
PCT Pub. Date: Feb. 24, 2011

(65) Prior Publication Data

US 2012/0138722 A1 Jun. 7, 2012

(30) Foreign Application Priority Data

Aug. 17, 2009 (DE) ........................ 10 2009 039 928

(51) Int. Cl.
*B02C 4/30* (2006.01)
*B23P 6/00* (2006.01)

(52) U.S. Cl.
USPC ....................................... 241/300; 29/402.01

(58) Field of Classification Search
USPC ............. 241/300; 492/28–37, 48; 29/402.01, 29/402.02
See application file for complete search history.

(56) References Cited

U.S. PATENT DOCUMENTS 3,412,946 A * 11/1968 Gabler et al. ................. 241/293
5,269,477 A * 12/1993 Buchholtz et al. ............ 241/293
5,601,520 A * 2/1997 Wollner et al. ................. 492/33
5,755,033 A * 5/1998 Gunter et al. ............. 29/895.32
2008/0142272 A1* 6/2008 Hall et al. ..................... 175/374
2009/0218429 A1 9/2009 Hagedorn et al.

FOREIGN PATENT DOCUMENTS

DE 102006010042 A1 * 9/2007 ................ B02C 4/30
DE 1002006010042 A1 * 9/2007 ................ B02C 4/30

* cited by examiner

*Primary Examiner* — Faye Francis
*Assistant Examiner* — Onekki Jolly
(74) *Attorney, Agent, or Firm* — Greer, Burns & Crain Ltd.

(57) ABSTRACT

A grinding roller for the high-pressure comminution of granular milling material, having a reinforcement with hard bodies which protrude from the surface of the main part of the grinding roller. At least some of the hard bodies have a continuous recess, wherein the recess extends in the radial direction of the grinding roller. Refurbishing the surface of the grinding roller is substantially simplified by the continuous recess.

12 Claims, 2 Drawing Sheets

ROLLER PRESS GRID ARMORING COMPRISING RING-SHAPED BOLTS

BACKGROUND OF THE INVENTION

Figure 1:
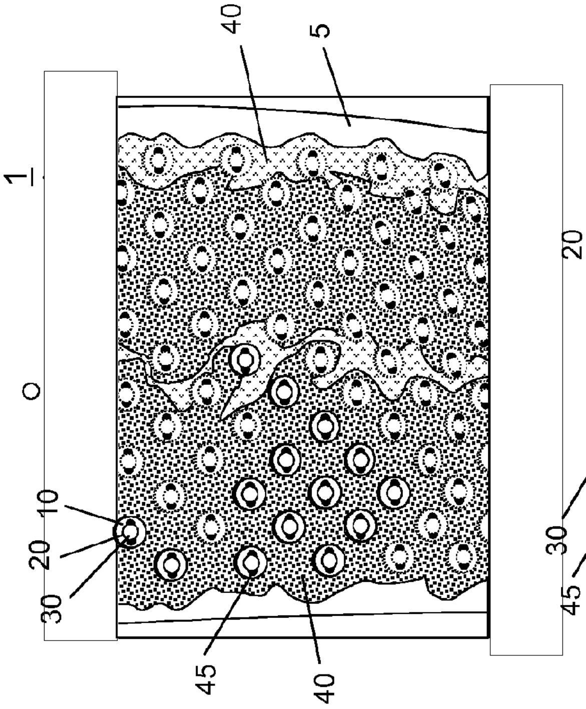

The invention relates to a grinding roll for the high-pressure comminution of granular milling material, having a reinforcement with hard bodies which protrude from the surface of the main part of the grinding roll.

According to Schonert, DE 27 08 053 C3, it is known for the comminution of brittle material to press this into so-called flakes by the application of high-pressure load in the roll gap, whereupon the entire material structure breaks and is thereby split into a large number of small fragments. This high-pressure comminution in the roll gap differs from comminution by shearing or rubbing, as happens in a traditional mill, because it is primarily a matter of compressive load. The material which passes through the roll gap hereupon wears the grinding rolls, so that even the grinding rolls used for high-pressure comminution, such as millstones, are subjected to a high level of wear. In order to minimize the wear, it is proposed in DE 100 14 836 A1 to incorporate into the surface of the grinding roll main part hard bodies, which protrude from the main part of the grinding roll. These hard bodies do not here serve primarily as armor for the surface of the main part of the grinding roll, but rather for the structuring of the surface, wherein the material to be comminuted collects on the surface of the main part of the grinding roll, in the spaces between the hard bodies. A layer of the actual material to be comminuted is thereby formed on the surface of the main part of the grinding roll, which layer protects the grinding roll from wearing load. Since in high-pressure comminution it is specifically not a matter of shearing load, but merely of the high pressure to which the material to be comminuted is subjected, the contrarotating grinding rolls run at equal and opposite speed and, where possible, without relative slip, in order to avoid unnecessary and unwanted abrasion of the hard bodies protruding from the surface of the main part of the grinding roll and in order not to continue to erode the layer of material to be comminuted. This type of wear protection is also termed "autogenous wear protection", because the wear protection layer consists of the actual material which is to be comminuted.

In practice it has been shown that the type of profile on the main part of the grinding wall has an influence on the stability of the autogenous wear protection layer. The tighter the grid of the protruding hard bodies, the more stable, in general, is the autogenous wear protection layer. In practice, a grid which is as tight as possible is therefore chosen in order to stabilize the wear protection layer. This is countered, however, by the fact that, as a result of a high number of hard bodies which also protrude from the wear protection layer, the actual surface of the autogenous wear protection layer is diminished. In addition to the type of grid and the number of hard bodies per unit of area, the shape of the hard bodies is also instrumental for the stability of the formation of an autogenous wear protection layer. Specifically in the start-up of a roller press having grinding rolls which still have no wear protection layer, or in the comminution of materials which are very dry and therefore have little inclination to bake in the spaces between the hard bodies and thereby form a stable layer, the arrangement and shape of the hard bodies on the surface has an influence on the formation of a stable autogenous wear protection layer.

A further aspect in the reinforcement of grinding rolls with hard bodies is the detachability of the hard bodies from the surface of the main part of the grinding rolls. For even with autogenous wear protection, the grinding roll gradually suffers damage through wear and tear. In consequence, the surface of the main part of the grinding rolls is no longer shaped perfectly cylindrically. In a roller press, the gap width and the gap pressure can hence no longer be optimally controlled, whereby the comminuting capacity of the roller press in question is reduced. In consequence thereof, it is necessary to keep supplying the material to the roller gap with greater frequency in a roller press having worn grinding rolls than in a grinding roll having unworn grinding rolls, whereby the number of revolutions of the milling material is increased and hence the grinding capacity of the roller press is reduced.

In order to recondition a grinding roll so as to restore the grinding capacity of the corresponding roller press, the surface of the grinding roll is generally therefore completely replaced. In this context, the hard bodies are removed from the surface, the grinding roll is trued by machining, so that it is again shaped perfectly cylindrically, and the receiving bores for the hard bodies in the surface of the grinding roll are correspondingly deepened to allow the insertion of new or still functional used hard bodies. Although the reconditioning of a grinding roll for high-pressure comminution is very labor-intensive, this type of reconditioning is still economical since the costs of the material of the grinding roll and the hard bodies are very high.

Since the surface of the main part of the grinding roll cannot be trued to a cylindrical format in the presence of the hard bodies, it is necessary to remove the hard bodies beforehand. The removal of all hard bodies from a grinding roll is very laborious, however, because, on the one hand, they are firmly anchored in the main part of the grinding roll and because the hard bodies are additionally driven into the material of the grinding roll by the load applied in the high-pressure comminution, and also because a grinding roll has 50 000 and more individual hard bodies.

In German laid-open application DE 10 2006 010 042 A1, it is proposed, for easier removal of the hard bodies, to provide the hard bodies with a central recess in which a removal tool is intended to engage. In the last-named laid-open application, a rather elongate shape is here proposed for the hard body and, corresponding to the elongate shape, the recess is narrow in relation to the diameter of the hard body. In practice it has been shown that these elongate hard bodies with narrow recess clog up with the material to be comminuted in a form which is difficult to remove again, and also that the recess is too narrow to wedge a powerful and robust removal tool therein. Though the relevant tool size permits removal, under the harsh conditions under which the hard bodies are exchanged a corresponding tool is too sensitive for long-term use.

In order to recondition the grinding roll in an alternative manner, it is proposed in DE 10 2008 014 809 A1 to groove the grinding roll from the side in a lathe and to erode the entire surface with the hard metal bodies beneath the lower end of the hard bodies in the main part of the grinding roll. This method can in principle be implemented in the installed state of the roller press at the site of the roller press itself, yet this type of reconditioning costs an undesirably large quantity of material, whereby the diameter of the grinding roll is also reduced, which ultimately is likewise detrimental to the grinding capacity.

SUMMARY OF THE INVENTION

The object of the invention is therefore to provide a grinding roll for the high-pressure comminution of granular material, which grinding roll enables the hard bodies to be removed from the surface of the main part with less effort.

The inventive object is achieved by virtue of the fact that at least a part of the profiled body has a continuous recess, wherein the recess extends in the radial direction of the grinding roll and wherein the ratio of height to width of the hard body is 1.5 or less.

Instead of the hard bodies which are customary in the prior art, it is proposed according to the invention that the hard bodies have a continuous recess, wherein the recess extends in the radial direction of the grinding roll. The hard bodies are not elongate in shape, but have in relation to the diameter of a cylindrical envelope shape of the hard body a height, measured in the radial direction in the state inserted in the surface of a grinding roll, which exceeds the above-defined diameter by no more than a factor of 1.5. The inventive hard body is thus flatter than the previously known hard bodies for reinforcing the surface of grinding rolls and allows, in relation to the diameter, a larger inner diameter of the continuous recess, so that a substantially more powerful tool in relation to the hard body size can be used to remove the hard body from the surface of the main part of the grinding roll. Though the ratio of the diameter of the recess to the diameter of the hard body is variable also in elongate hard bodies, this is only at the expense of the remaining wall thickness, which in elongate hard bodies proves to be too small and breaks during use. The inventive hard bodies are introduced into the surface of the grinding roll in such a way that they are slipped onto a stay bolt which is arranged centrally in a blind hole and supports the wall between the recess and the outer periphery. The stay bolt here optionally consists of the material of the surface of the grinding roll itself, since the stay bolt was left standing when a circular bore was made in the surface of the main part of the grinding roll, or it is possible to introduce a stay bolt made of a further material centrically into the middle of the bore and to slip the hard body onto this. Finally, it is possible to introduce the hard body with the recess into a blind hole without stay bolt and to at least partially fill in the recess with a form-fitting body following insertion of the hard body into the recess. The recess should be at least partially filled in order to prevent the material of the autogenous wearing layer from collecting on the floor of the blind hole and settling there, but also and specifically to protect the hard body from a deformation movement which, during operation, eventually ends in a breakage of the hard body in the surface of the grinding mill.

The fact that the recess is filled during operation of the grinding roll serves to prevent the recess from filling with material to be comminuted and hence the recess, for the removal of the hard bodies, first has to be laboriously cleared of the material of the autogenous wearing protection layer.

For the replacement of the grinding roll, it is correspondingly provided to remove the material of the stay bolt, or of a molded body used as a stay bolt, from the recess, most easily by boring-out, in order subsequently to remove the hard body from the surface of the main part of the grinding roll with a tool which wedges in the bore. The inventive hard body has the advantage over a known hard body made of solid material that, by virtue of the prepared recess, it is easier to remove, for it is only with great effort that a bore can be made in the hard body made of solid material for the attachment of a tool. Once all hard bodies are removed from the surface, the grinding roll is trued to a cylindrical measure and the bores for the hard bodies in the surface of the main part of the grinding roll are deepened correspondingly to the depth of erosion of the surface of the main part of the grinding roll and new or still functional used hard bodies comprising the continuous recess are reinserted into the surface.

In the use of a roller press, not all hard bodies, nor the entire surface of the grinding roll, are uniformly worn. On the rims of the grinding roll, the hard bodies and the surface of the grinding roll are generally less heavily loaded. As a result of the lower load, the material of the surface of the main part of the grinding rolls is less strongly eroded or deformed at these places, so that the hard bodies are there not driven into the surface. As a result, these hard bodies can generally be removed more easily and with less effort from the surface of the main part of the grinding roll. Depending on the application, it may also suffice if only a part of the surface of the grinding roll is reinforced with hard bodies comprising the continuous recess.

Since the shape of the hard cylinders has an influence on the inclination to form a stable autogenous wearing protection layer, it is provided according to the invention that the hard bodies have as the basic main profile the shape of a general cylinder with bore, preferably as the basic main profile the shape either of a hollow circular cylinder or of a hollow prism or of a hollow cylinder with elliptical base.

A general cylinder is to be understood, within the scope of the invention, to be any chosen base configuration which, by movement along a surface perpendicular to the surface plane of the base, defines a three-dimensional body. The edges which are thus formed can here be beveled with a chamfer and it is also possible for the edges to be rounded or carry beads. A secondary profile is thereby formed. The shape of the cylinder as the basic main profile entails the basic envelope shape as the basic main profile, which basic envelope shape surrounds the hard body. If the edges of the hard body are not chamfered or rounded, then beads or protracting edges as a secondary profile can also breach a basic envelope shape as the main profile.

As the base of the general cylinder, convex shapes may be considered, such as a circle, an ellipse, a square, a rectangle, a pentagon or hexagon, or generally polygonal, regular or irregular, symmetrical or asymmetrical, but also concave-convex shapes, like a cross, a star, a T-shape, an H-shape, all shapes regular or irregular, symmetrical or asymmetrical.

In one particular embodiment of the invention, the hard bodies are shaped like an oblique general cylinder as the basic main profile, wherein the base is shaped like that of the general cylinder, but the cylinder, as the basic main profile, is brought into an oblique shape by shearing. As a result of the shape of an oblique general cylinder, the hard bodies, seated in the surface of the main part, can be lent a preferential direction in order to promote the formation of a wear protection layer.

Just like the outer envelope shape of the hard body as the main profile, the continuous recess can in cross section have substantially a circular profile, substantially an elliptical profile or substantially a polygonal profile, or can substantially have a shape which has been described above for the base of the general cylinder. As a secondary profile, round or pointed bulges, which point inward or outward, or chamfers or beads on the rims of the continuous recess, may be considered. The cross section of the continuous recess can here be shaped symmetrically or asymmetrically, regularly or irregularly. As a result of a non-cylindrical shape of the continuous recess, for the removal of the hard body this can be broken off by turning with the aid of a tool in its bore.

Figure 2:
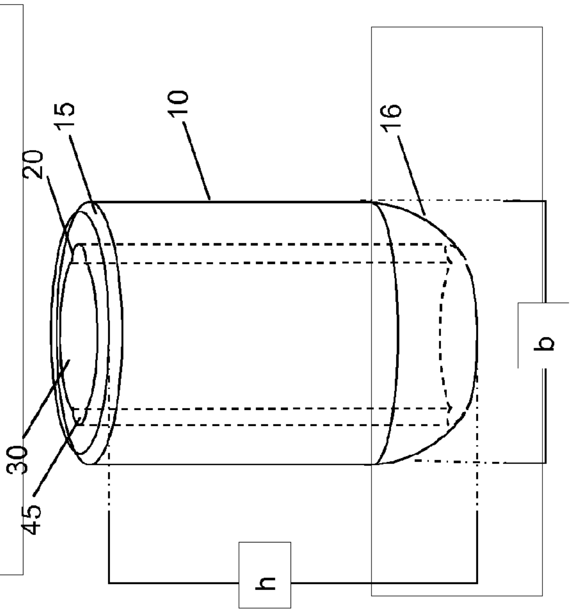
Figure 3:
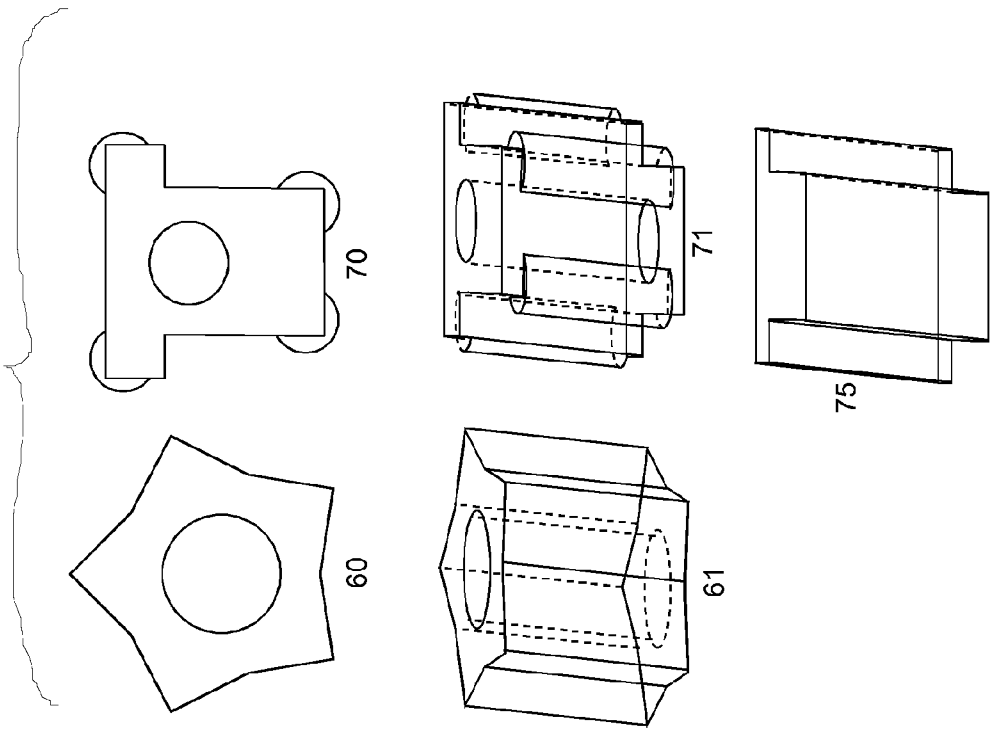
Figure 4:
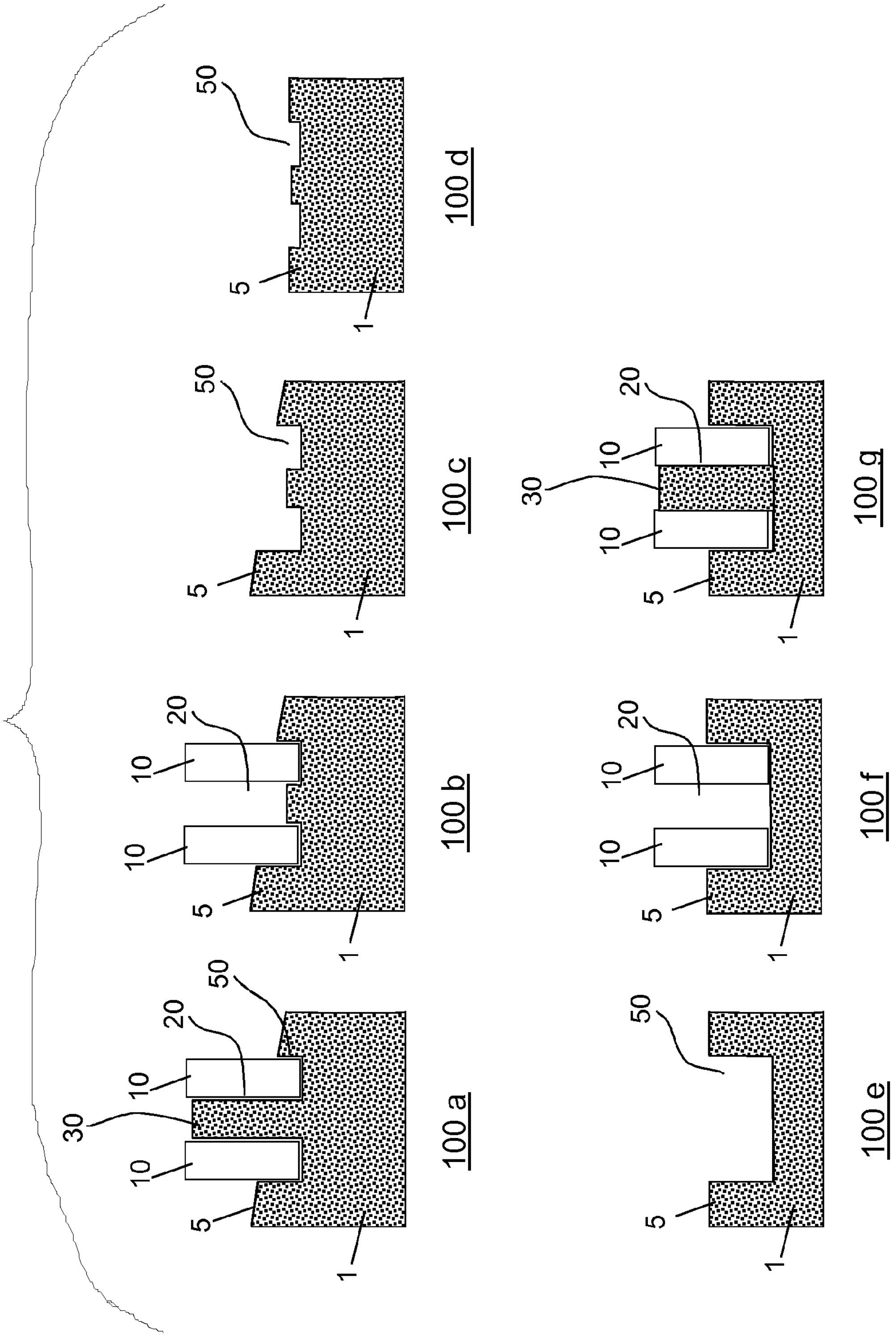

The invention is explained in greater detail with reference to the following figures, wherein:

FIG. 1 shows a top view of the surface of an inventive grinding roll with autogenous wear protection layer, FIG. 2 shows a perspective view of a hard body, FIG. 3 shows examples of cross-sectional profiles of the hard body, FIG. 4 shows the steps of a method of refurbishing the surface of the grinding roll.

In FIG. 1 a top view of the surface 5 of an inventive grinding roll 1 with an autogenous wear protection layer of milling material 40 is shown, in which surface 5 hard bodies 10 are embedded. Hard bodies 10 have a continuous recess 20, which in the embedded state of the hard bodies 10 extends substantially in the radial direction of the grinding roll 1, the height h of the hard body in the radial direction, in that state of the hard body in which it is inserted in the surface, being no higher than 1.5 times the diameter or the width b of a cylindrical envelope curve of the hard body. Insofar as the hard bodies 10 have the shape of a general, oblique cylinder and thus show a preferential direction when the grinding roll 1 is rotated, the orientation of the continuous recess 20 can be strictly radial or else can deviate from the radial direction of the grinding roll 1 by the measure of the tilted shape of the oblique general cylinder. During operation of the grinding rolls 1 in a high pressure roller press, milling material 40 to be comminuted collects in the spaces between the hard bodies 10, which milling material forms an autogenous wear protection layer. The autogenous wear protection layer is here generally thinner and looser on the rim of the grinding roll 1 than in the middle, where the main compaction zone in the roll gap of the corresponding roller press is present. The different density and layer thickness are represented in FIG. 1 by dotted marking of different intensity. During operation of the grinding roll 1, the continuous recess 20 is at least partially filled with a form-fitting body 30 in order that no milling material 40 collects in the recess 20, hardens there and thus, when the hard bodies 10 are extracted, requires an increased work effort to get it off. Furthermore, the form-fitting body protects the wall between the continuous recess 20 and the periphery from an unwanted, fracture-inducing deformation movement of the hard body 10 during operation of the roller press. In one embodiment of the invention, the hard bodies 10 have in the continuous recess 20 as a secondary profile two bulges 45, by which a tool in the continuous recess 20 can positively grip the hard body 10, wherein the tool, by virtue of the recess 45, can break off the hard body 10 by twisting in a blind hole or bore 50 in which the hard bodies 10 are respectively accommodated. This way of detaching a hard body 10 in a blind hole lends itself to glued-in hard bodies 10. Once a hard body 10 has been broken off by twisting in its blind hole 50, it is able to be removed from the blind hole 50 relatively easily.

In FIG. 2, an individual hard body 10, according to one embodiment of the invention, of the grinding roll 1 from FIG. 1 is represented. As the main profile, a cylindrical shape of the hard body 10 is clearly discernible, wherein the main profile deviates from the envelope shape of a perfect cylinder shape by way of a chamfer 15 as a secondary profile. The height h of the hard body in the radial direction, in that state of the hard body in which it is inserted in the surface, is here no higher than 1.5 times the diameter or the width b of a cylindrical envelope curve of the hard body 10. The hard body 10 is passed through in the middle by a continuous, cylindrical recess 20, which, in the embedded state of the hard body 10, is at least partially filled with a form-fitting body 30 in order to prevent milling material from collecting in the continuous recess 20 and hardening there and thereby protect the hard body 10 from an unwanted deformation movement which can lead to the breakage of the hard body 10. On the bottom side, the main profile of the hard body 10 deviates by virtue of a spherical-cap-shaped or semispherical round bottom 16, wherein the continuous recess 20 breaches the semispherical round bottom in the middle. The continuous recess 20 has as a secondary profile two bulges 45, by which the continuous recess deviates from a perfectly cylindrical shape. In addition to bulges, hexagonal recesses, square recesses, cruciform or slotted recesses may also be considered in order thereby to make the hard bodies 10 grippable for a torsion tool.

In FIG. 3, two random examples of the cross section of a hard body 10 are represented, wherein these examples in star shape and as a polygonal shape are just a couple of examples of a large number of possible cross-sectional profiles. Cross-sectional profiles 60 as a star-shaped profile and a cross-sectional profile 70 as a substantially T-shaped profile form two examples of a large number of different cross-sectional profiles, wherein the hard body corresponding to the cross-sectional profile 60 has, for instance, the envelope shape of an oblique general cylinder, which is represented in a perspective view in sub-FIG. 61 and the envelope shape of which is identical with the shape of the hard body. In contrast, the envelope shape of the hard body with the cross-sectional profile 70 comprising at the edges round bulges which do not extend over the entire cross section of the general, oblique cylinder has a secondary profile which breaches the main profile. The main profile, which is represented in sub-figure 75, has the shape of an oblique general cylinder having a T-shaped base.

In FIG. 4, the working steps for the replacement or refurbishment of a grinding roll 1 are represented, each working step being indicated by different states (100*a*, 100*b*, 100*c*, 100*d*, 100*e*, 100*f*, 100*g*) of the surface of the main part of the grinding roll 1. The individual states (100*a*, 100*b*, 100*c*, 100*d*, 100*e*, 100*f*, 100*g*) respectively represent a radial section of a grinding roll 1, wherein the radial section runs through the middle of the hard body 10. It can clearly be recognized from the shading of the main part of the grinding roll 1 that the material of the surface 5 of the grinding roll 1 fills the hard body 10 in its recess by virtue of a form-fitting body 30.

For the inventive replacement or refurbishment of the grinding roll 1, the form-fitting body 30, which can consist of the material of the surface 5 of the actual grinding roll 1, is bored out of the hard body 10, represented by the states 100*a*-100*b*, which represent the respective state before and after the boring-out, and a tool, which wedges in the recess 20, is used to remove the hard body 10 from the surface 5 of the grinding roll 1, represented by the before and after states 100*b*-100*c*. After this, the surface 5 is rid of the hard bodies 10 and the worn profile of the surface 5 of the grinding roll 1 appears, state 100*c*. Following machining of the surface 5, represented by the before and after states 100*c*-100*d*, the blind hole 50 in which the hard body 10 is embedded is deepened correspondingly to the erosion of the surface 5 of the grinding roll 1, the before and after states 100*d*-100*e*, and a hard body 10, new or used, is inserted in the surface 5 into the deepened blind hole 50, as represented by the sectional drawings as the state 100*e* prior to insertion of the hard body 10 and the sectional drawing as the state 100*f*. Following the insertion of the hard body 10, the continuous recess 20 of the hard body 10 is refilled with a form-fitting body 30. The form-fitting body 30 can be a stay bolt, which is screwed in on the floor of the blind hole 50, or the form-fitting body 30 is driven into the continuous recess 20 of the hard body 10.

For the replacement of the surface 5 of the main part of the grinding roll 1, the following procedural steps are thus obtained: removal (100*a*-100*b*) of any material present in the continuous recess of the hard body 10, extraction (100*b*-100*c*) of the hard body 10 with a tool which wedges in the continuous recess 20 of the hard bodies 10 or grips the hard bodies 10 therein, restoration (100*c*-100*d*) of the shape of the main part of the grinding roll 1 by machine cutting, wherein the main part of the grinding roll 1 is slightly reduced in size, if need be deepening (100*d*-100*e*) of the bores in which the hard bodies 10 are seated, insertion (100*e*-100*f*) of new or still usable, used hard bodies 10, and, finally, filling (100*f*-100*g*) of the continuous recess 20 with a form-fitting body 30.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

| REFERENCE SYMBOL LIST | |
|---|---|
| 1 | grinding roll |
| 5 | surface |
| 10 | hard body |
| 15 | chamfer |
| 16 | round bottom |
| 20 | recess |
| 25 | bulge |
| 30 | body |
| 40 | milling material |
| 45 | bulge |
| 50 | blind hole |
| 60 | hard body, top view |
| 61 | hard body, perspective view |
| 70 | hard body, top view |
| 71 | hard body, perspective view |
| 75 | envelope shape |
| 100a | state before replacement |
| 100b | state after boring-out of the form-fitting body |
| 100c | state after removal of the hard body |
| 100d | state after machining of the surface |
| 100e | state after deepening of the blind hole |
| 100f | state after insertion of the hard body |
| 100g | state after filling of the recess |

The invention claimed is:

1. A grinding roll having a cylindrical shape with a central axis of rotation for the high-pressure comminution of granular milling material, having a reinforcement with a plurality of hard bodies which protrude radially from a cylindrical surface of a main part of the grinding roll, comprising at least some of the hard bodies having a continuous recess extending therethrough, wherein the recess extends in a radial direction of the grinding roll and wherein a ratio of radial height to width of the hard bodies with the continuous recess is 1.5 or less, and wherein the hard bodies with a continuous recess each have, in the radial direction of the grinding roll, in addition to a main profile of the continuous recess of a particular geometric shape, a secondary profile of the continuous recess, wherein the secondary profile comprises at least one round or pointed bulge to at least one of the inside and outside of the geometric shape of the continuous recess, a chamfer, and a rounding on edges of the hard body, the secondary profile of the continuous recess being arranged one of symmetrically and asymmetrically.

2. The grinding roll as claimed in claim 1, wherein the hard bodies with the continuous recess have a shape of a general cylinder with a bore.

3. The grinding roll as claimed in claim 2, wherein the hard bodies with the continuous recess have the shape of one of a hollow circular cylinder, a hollow prism and a hollow cylinder with an elliptical base.

4. The grinding roll as claimed in claim 1, wherein the hard bodies with the continuous recess have a shape of an oblique general cylinder with a bore.

5. The grinding roll as claimed in claim 4, wherein the hard bodies with the continuous recess have the shape of one of an oblique hollow circular cylinder, an oblique hollow prism and an oblique hollow cylinder with an elliptical base.

6. The grinding roll as claimed in claim 1, wherein the hard bodies with the continuous recess are one of symmetrically and asymmetrically shaped.

7. The grinding roll as claimed in claim 1, wherein the continuous recess in cross section has one of a circular profile, an elliptical profile, and a polygonal profile.

8. The grinding roll as claimed in claim 1, wherein the continuous recess has in a lateral cross section, in addition to a main profile of a particular geometric shape, a secondary profile, wherein the secondary profile comprises at least one round or pointed bulge extending to the lateral inside and/or outside of the geometric shape of the main profile and is arranged one of symmetrically or asymmetrically.

9. The grinding roll as claimed in claim 1, wherein the continuous recess is at least partially filled with a material used in the main part of the grinding roll.

10. The grinding roll as claimed in claim 1, wherein the continuous recess is at least partially filled with a form-fitting body.

11. A method for replacing a reinforcement comprising hard bodies protruding radially from a cylindrical surface of a main part of a grinding roll, the hard bodies having a continuous recess extending therethrough in a radial direction of the grinding roll, comprising the following steps:

removing any material present in the continuous recess of the hard body, extracting the hard body from bores in the grinding roll with a tool which wedges in the continuous recess of the hard bodies or grips the hard bodies therein, restoring the shape of the main part of the grinding roll by machine cutting, wherein the main part of the grinding roll is slightly reduced in size, if need be deepening the bores for the reception of the hard bodies, inserting new or still usable, used hard bodies, wherein the hard bodies with a continuous recess each have, in the radial direction of the grinding roll, in addition to a main profile of the continuous recess of a particular geometric shape, a secondary profile of the continuous recess, wherein the secondary profile comprises at least one round or pointed bulge to at least one of the inside and outside of the geometric shape of the continuous recess, a chamfer, and a rounding on edges of the hard body, the secondary profile being arranged one of symmetrically and asymmetrically, filling the continuous recess with a form-fitting body.

12. The method as claimed in claim 11, including the step of twisting the hard body in its bore.

* * * * *